Dec. 27, 1949     F. H. SCHULZ     2,492,895
CONCRETE MIXER
Filed Oct. 19, 1946
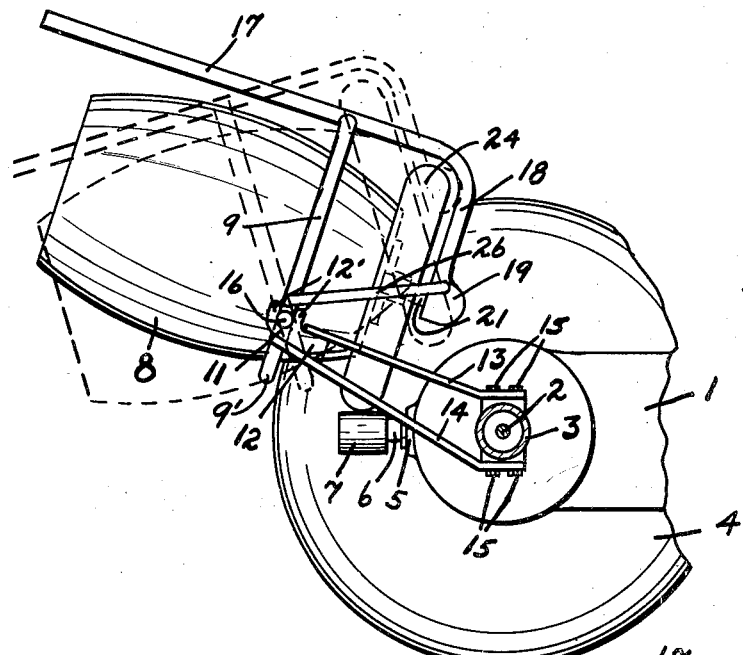
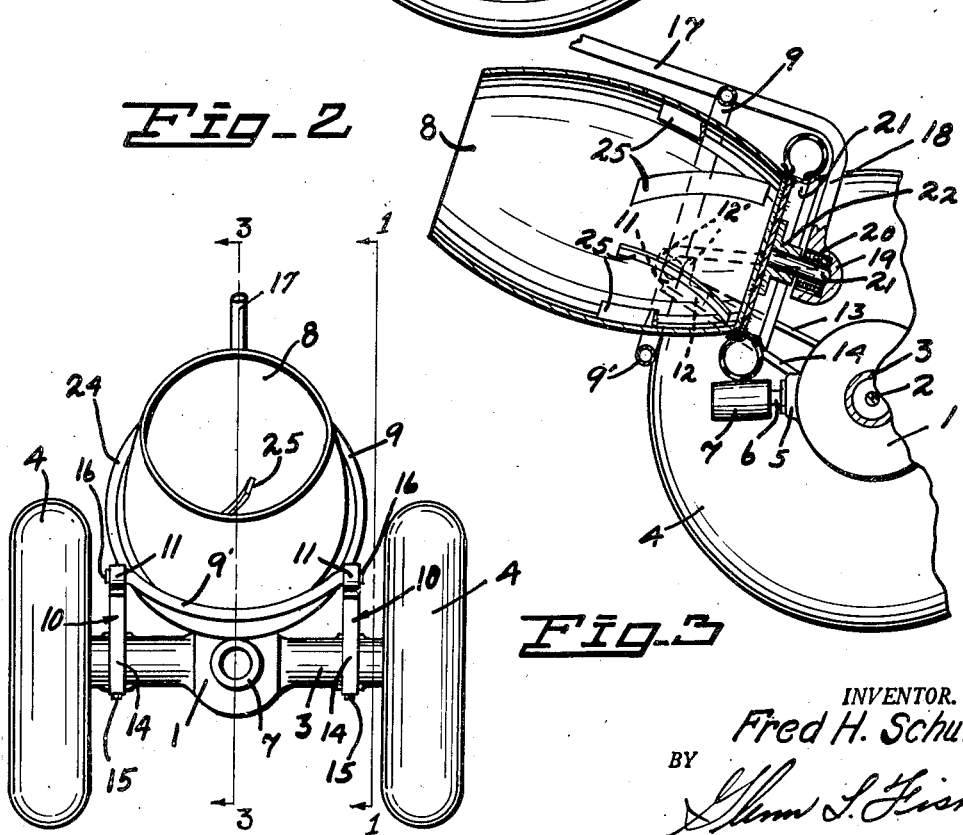
INVENTOR.
Fred H. Schulz
BY
Glenn S. Fish
ATTORNEY Patented Dec. 27, 1949

2,492,895

UNITED STATES PATENT OFFICE 2,492,895

CONCRETE MIXER

Fred H. Schulz, Spokane, Wash.

Application October 19, 1946, Serial No. 704,455

5 Claims. (Cl. 259—177)

1

This invention relates to a concrete mixer and it is one object of the invention to provide a mixer which may be mounted on a tractor and operated from a power takeoff of the tractor. A mixer so constructed will be especially useful to farmers and contractors who wish to mix concrete while hauling it to the place where it is to be used.

Another object of the invention is to provide a concrete mixer of such construction that when it is in use it may be applied to a tractor and project rearwardly therefrom in such position that a tire constituting an element of the driving mechanism for the mixer will rest upon and be rotated by a pulley carried by the power takeoff of the tractor.

Another object of the invention is to provide a mixer having a frame in which a mixing barrel or drum is rotatably mounted, the frame having brackets formed with arms which are mounted about the rear axle casing of the tractor and securely hold the mixer in place at the back of the tractor.

Another object of the invention is to provide a concrete mixer which is of simple construction, capable of being manufactured at low cost, and which may be very easily applied to or removed from a tractor.

The invention is illustrated in the accompanying drawings wherein:

Fig. 1 is a view taken along line 1—1 of Figure 2 and showing the mixer in side elevation and mounted upon a tractor, one wheel of which has been removed for sake of clearness.

Fig. 2 is a rear view showing a mixer mounted upon the tractor.

Fig. 3 is a view taken along line 3—3 of Figure 2 and showing the mixer in vertical longitudinal section.

The tractor 1 upon which the concrete mixer has been shown mounted is of conventional construction and has the usual rear axle 2 which passes through an axle casing 3 and carries the rear wheels 4 of the tractor. A power take-off 5 is provided at the rear of the tractor and upon the shaft 6 thereof is mounted a pulley 7.

The mixer is mounted at the rear end of the tractor and has a barrel or drum 8 which may be of any suitable size and is over the power take-off in evenly spaced relation to the rear wheels of the tractor. The barrel extends through a ring 9 forming an element of the frame of the mixer, and from an inspection of Figure 3 it will be seen that this ring is formed of metal tubing so that it will be strong but of light weight. Brackets 10

2 are provided at opposite sides of the frame and each has a bearing block 11 formed with arm 12 at its rear end carrying forwardly projecting upper and lower arms 13 and 14 which have their front ends secured to upper and lower portions of the axle casing 3 by screws or equivalent fasteners 15. The lower portion 9' of the ring 9 has its end portions projecting laterally from opposite sides of the ring and forming lugs or pintles 16 which are engaged with the brackets and rest between the forks 12' of the blocks 11. Therefore the ring will be well supported by the brackets 10 but may be turned about the pintles and the barrel tilted to the dumping position indicated by dotted lines in Figure 1 and may also be lifted from the brackets when so desired. A metal bar or handle 17 extends longitudinally of the barrel, over the same, and this bar or handle has its inner or front end portion bent to form a downwardly extending arm 18 at the lower end of which is a block or cup 19 open at its rear end and carrying a bearing 20. A stub shaft 21 projects from the socket 22 mounted centrally of the bottom or front end of the barrel, and this shaft is rotatably supported in the bearing 20 so that the barrel will rotate easily in the frame. About the front end or bottom of the barrel is mounted a rim 23 carrying a tire 24 which is of the usual construction used for automobiles and rests upon the pulley 7, and from an inspection of Figures 1 and 3 it will be readily seen that frictional engagement of the tire with the pulley will cause the barrel to be rotated and concrete may be mixed in the barrel as the tractor is driven to a place where the concrete is to be used. Blades or paddles 25 which are mounted against the wall of the barrel and extend longitudinally of the barrel in spiral paths cause the concrete to be thoroughly mixed during rotation of the barrel. Arms 26 which extend between the block 19 and opposite sides of the ring 9 serve to brace the cup and prevent it from moving out of a position in alignment with the shaft 21 and the shaft will therefore not be bent by strains.

Having thus described the invention, what is claimed is:

1. In combination with a tractor having a rear axle casing and a power take-off including a horizontal rotary shaft projecting rearwardly from the tractor longitudinal thereof and a pulley carried by the said shaft, a concrete mixer comprising brackets carried by the rear axle of the tractor and projecting rearwardly from the tractor at an upward incline, a frame between the brackets pivotally supported thereby above the power take off for tilting movement vertically, a container extending longitudinally in said frame and rotatably mounted therein and over its rear end, and a traction member about the forward portion of said container for resting upon said pulley in frictional engagement therewith when the frame is in its normal position and thereby causing rotary motion to be transmitted to the container, said traction member moving upwardly out of engagement with the pulley when the frame is tilted to move the container to a dumping position.

2. In combination with a tractor having a power take-off at its rear including a rotary shaft projecting rearwardly from the tractor longitudinally thereof and carrying a pulley, a frame back of the tractor, brackets removably carried by the tractor at opposite sides of the frame and pivotally mounting the frame for vertical tilting movement, a container rotatably carried by said frame and extending rearwardly from the traction and open at its rear end, and a tractor member about the front end of the container for resting upon the upper portion of the pulley and causing rotation of the container, said traction member moving upwardly out of driving engagement with the pulley when the container is tilted to a dumping position.

3. A concrete mixer constituting an attachment for a tractor and comprising brackets adapted to be mounted upon a tractor and project rearwardly therefrom at opposite sides of a power take off of the tractor, the said power take off being provided with a pulley, a frame including a ring having pinions projecting horizontally from opposite sides thereof and pivotally engaged with said brackets to mount the frame for vertical tilting movement about a horizontal axis, a handle bar extending longitudinally of the frame and secured intermediate its length to the upper portion of said ring, the front portion of the handle bar being extended downwardly in forwardly spaced relation to the ring and provided at its lower end with a bearing open at its rear end, braces extending between the bearing and opposite sides of the ring, a mixing drum extending longitudinally of the frame through the ring and open at its rear end, a stub shaft projecting forwardly from the center of the front end of the drum and removably engaged in the bearing to rotatably mount the drum, and a traction member mounted about the front end of the drum and resting upon the pulley of the power take off in frictional engagement therewith to transmit rotary motion to the drum when the frame is in its normal position, said handle bar projecting rearwardly from the container and constituting means for tilting the frame and thereby moving the drum to a dumping position and shifting the traction member upwardly out of driving engagement with the pulley.

4. A concrete mixer constituting an attachment for a tractor having a power take off at its rear end including a shaft extending longitudinally from the tractor and a pulley carried by the shaft, said mixer comprising brackets adapted to be secured to a tractor at opposite side of the power take off thereof and project rearwardly from the tractor, a frame pivotally carried by said brackets for vertically tilting movement about a horizontal movement about a horizontal axis from a normal position to a dumping position and extending rearwardly from the tractor, a bearing at the front end of the frame, a mixing drum extending longitudinally of the frame and tiltable therewith to a dumping position and having its rear end open, a stub shaft projecting forwardly from the drum centrally thereof and engaged in the bearing to rotatably mount the drum, a rim about the front end of the drum, an annular traction member carried by said rim and being formed of rubber and normally resting upon the upper portion of the pulley of the power take off to transmit rotary motion from the power take off to the drum, and a handle for the frame projecting rearwardly over and beyond the drum and constituting means for tilting the frame and moving the frame and the drum to a dumping position while shifting the traction member upwardly out of driving engagement with the pulley.

5. A concrete mixer constituting an attachment for a tractor having rear axle casing and a power takeoff including a rotary shaft projecting rearwardly from the tractor longitudinally thereof and a pulley carried by the shaft; said mixer comprising brackets adapted to be mounted upon the rear axle casing and project rearwardly at an upward incline therefrom, said brackets having bearings at their rear ends, a frame between said brackets extending longitudinally thereof and open at its rear end, trunnions projecting laterally from opposite sides of said frame and seated in said bearings and pivotally mounting the frame for vertical tilting movement from a normal position in which it extends rearwardly at an upward incline to a downwardly tilted position, a bearing centrally located at the front end of said frame and open at its rear end, a cylindrical container passing longitudinally through said frame and being open at its rear end and having a head closing its front end, a stub shaft projecting forwardly from the center of the head and rotatable engaged in the bearing at the front end of the frame and mounting the container for rotary movement about its longitudinal axis, a rim surrounding the rear end of said container, and a tire mounted about said rim and projecting radially from the rear end of said container in position for resting upon the upper portion of the pulley of the power take-off and causing rotation of the container when the pulley is rotating.

FRED H. SCHULZ.

REFERENCES CITED

The following references are of record in the file of this patent:

UNITED STATES PATENTS

| Number | Name | Date |
| --- | --- | --- |
| 1,369,870 | Wynn | Mar. 1, 1921 |
| 1,475,904 | Vanderplus | Nov. 27, 1923 |
| 1,777,318 | MacGregor | Oct. 7, 1930 |
| 1,867,838 | Jaeger | July 19, 1932 |
| 2,397,851 | Gaetner | Apr. 2, 1946 |
| 2,447,071 | Huffman | Aug. 17, 1948 |

FOREIGN PATENTS

| Number | Country | Date |
| --- | --- | --- |
| 447,695 | Great Britain | May 25, 1936 |